(12) United States Patent
Rangarajan et al.

(10) Patent No.: US 10,742,738 B2
(45) Date of Patent: Aug. 11, 2020

(54) FLEXIBLE DETERMINISTIC COMMUNICATIONS NETWORK

(71) Applicant: The Boeing Company, Chicago, IL (US)

(72) Inventors: Murali Rangarajan, Chesterfield, MO (US); Yong-Long Calvin Ling, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 509 days.

(21) Appl. No.: 14/802,680

(22) Filed: Jul. 17, 2015

(65) Prior Publication Data
US 2017/0019479 A1 Jan. 19, 2017

(51) Int. Cl.
*H04L 29/08* (2006.01)
*G08G 5/00* (2006.01)
(Continued)

(52) U.S. Cl.
CPC ........... *H04L 67/12* (2013.01); *G08G 5/0008* (2013.01); *H04L 1/0006* (2013.01);
(Continued)

(58) Field of Classification Search
CPC ..... H04L 67/12; H04L 1/0006; H04L 1/0011; H04L 1/242; H04L 12/40169; H04L 12/4625; H04L 2012/4028; H04L 2012/40267; H04L 12/66; H04L 12/40; H04L 2012/40273; H04L 12/40026; G08G 5/0008
(Continued)

(56) References Cited

U.S. PATENT DOCUMENTS 6,212,169 B1 * 4/2001 Bawa ................. H04Q 11/0478
370/252
7,039,056 B2 * 5/2006 Brouwer ............. H04L 12/6418
370/395.43
(Continued)

FOREIGN PATENT DOCUMENTS

| CN | 104680853 A | 3/2015 |
|---|---|---|
| EP | 1355458 A2 | 10/2003 |
| EP | 2584741 A1 | 4/2013 |

OTHER PUBLICATIONS

Office Action EP (dated 2018).*
(Continued)

*Primary Examiner* — Tan Doan
(74) *Attorney, Agent, or Firm* — Sage Patent Group

(57) ABSTRACT

A system onboard a vehicle may include a vehicle management system (VMS) and a mission management system (MMS). The VMS may include a plurality of VMS nodes for controlling operation of the vehicle. The MMS may include a plurality of MMS nodes for controlling equipment associated with a mission of the vehicle. The system may also include a flexible deterministic communications network. The flexible deterministic communication network may be configurable for communications between each of the VMS nodes, between each of the MMS nodes and between the VMS nodes and the MMS nodes. The VMS nodes communicate using static, deterministic messages and the MMS nodes communicate using dynamic, non-deterministic messages.

19 Claims, 6 Drawing Sheets

(51) Int. Cl.
  *H04L 1/00* (2006.01)
  *H04L 1/24* (2006.01)
  *H04L 12/40* (2006.01)
  *H04L 12/46* (2006.01)
(52) U.S. Cl.
  CPC ............ *H04L 1/0011* (2013.01); *H04L 1/242* (2013.01); *H04L 12/40169* (2013.01); *H04L 12/4625* (2013.01); *H04L 2012/4028* (2013.01); *H04L 2012/40273* (2013.01)
(58) Field of Classification Search
  USPC ........................................................ 709/206
  See application file for complete search history.

(56) References Cited

U.S. PATENT DOCUMENTS

| | | | | |
|---|---|---|---|---|
| 8,964,555 B1* | 2/2015 | Miller | ............... | H04L 12/40136 370/235 |
| 8,972,512 B2 | 3/2015 | Mays et al. | | |
| 2004/0081193 A1* | 4/2004 | Forest | ................... | H03M 13/43 370/458 |
| 2004/0153545 A1* | 8/2004 | Pandya | ................... | H04L 29/06 709/226 |
| 2004/0184406 A1* | 9/2004 | Iwamura | ................ | H04B 3/542 370/235 |
| 2005/0114541 A1* | 5/2005 | Ghetie | .................... | H04L 47/10 709/232 |
| 2007/0097973 A1* | 5/2007 | Scudder | .................. | H04L 45/00 370/392 |
| 2008/0008183 A1* | 1/2008 | Takagaki | ................ | H04L 45/00 370/392 |
| 2011/0066854 A1* | 3/2011 | Poledna | ............ | H04L 12/40136 713/168 |
| 2011/0239259 A1* | 9/2011 | Udani | ................. | H04L 12/2807 725/85 |
| 2013/0073764 A1* | 3/2013 | Deb | ........................ | H04L 12/66 710/241 |
| 2013/0170498 A1* | 7/2013 | Danielsson | ......... | H04L 12/4015 370/400 |
| 2013/0208630 A1* | 8/2013 | Bobrek | ................... | H04L 67/12 370/276 |
| 2015/0146605 A1* | 5/2015 | Rubin | ...................... | G08G 9/02 370/312 |

OTHER PUBLICATIONS https://www.webopedia.com/TERM/isochronous.html Jun. 4, 2016 p. 1 (Year: 2016).*
Eurpopean Patnet Office; Extended European Search Report for European Application No. 16179809.5 dated Nov. 14, 2016, 14 pages.
Wikipedia; "ARINC," Downloaded from <http://en.wikipedia.org/wiki/ARINC> on May 29, 2015, 7 pages.
Wikipedia; "Data Distribution Service," Downloaded from <http://en.wikipedia.org/wiki/Data_Distribution_Service> on Apr. 3, 2015, 7 pages.
European Patent Office; Office Action for European Patent Application No. 16179809.5 dated Dec. 14, 2017, 10 Pages.
European Patent Office; Office Action for European Patent Application No. 16179809.5 dated Jun. 25, 2018; 11 Pages.
European Examination Report dated Mar. 29, 2019 for European Patent Application No. 16179809.5, 6 pages.
Russian Office Action dated Sep. 20, 2019 for Russian Patent Application No. 2016116861/12(026489), 5 pages.
Chinese First Office Action dated Apr. 23, 2020 for Chinese Patent Application No. 201610395209.1, 17 pages including English translation.

* cited by examiner

FLEXIBLE DETERMINISTIC COMMUNICATIONS NETWORK

FIELD

The present disclosure relates to communications and communications networks, and more particularly to a flexible deterministic communications network and method for use with a vehicle, such as an aircraft, spacecraft, vessel or other vehicle.

BACKGROUND

Current aircraft or other vehicles may use separate networks for vehicle management system communications (VMS) and mission management system (MMS) communications. Examples of VMS systems may include systems, subsystems or components for controlling operation of the aircraft or vehicle. MMS systems may include systems, subsystems or components for performing a mission of the aircraft or vehicle. Examples of systems, subsystems or components for performing a mission of an aircraft or vehicle may include but is not necessarily limited to surveillance systems, such as integrated surveillance radar (ISR) systems, optical surveillance systems or other type surveillance systems, weapons systems, electronic countermeasures or communications jamming systems and other systems for performing a specific mission. In an aircraft or spacecraft, VMS nodes communicate with one another over a deterministic network using Aeronautical Radio, Incorporated (ARINC) 664 or A 664 message protocol or some other static, deterministic protocol. MMS nodes may communicate with one another using a non-deterministic network, such as an Ethernet. A bridging node must be provided for VMS nodes and MMS nodes to communicate with one another. The two separate communications networks add additional weight and expense to the vehicle. This can be particularly important in vehicles such as aircraft and spacecraft where additional weight results in higher fuel and operating costs. The two separate communications networks also include more components that can fail and require additional time and expense to maintain. Accordingly, there is a need for a simplistic solution that can support communications of both VMS and MMS systems and provide communications between the two systems when needed.

SUMMARY

In accordance with an embodiment, a system onboard a vehicle may include a vehicle management system (VMS) and a mission management system (MMS). The VMS may include a plurality of VMS nodes for controlling operation of the vehicle. The MMS may include a plurality of MMS nodes for controlling equipment associated with a mission of the vehicle. The system may also include a flexible deterministic communications network. The flexible deterministic communications network may be configurable for communications between each of the VMS nodes, between each of the MMS nodes and between the VMS nodes and the MMS nodes. The VMS nodes communicate using static, deterministic messages and the MMS nodes communicate using dynamic, non-deterministic messages.

In accordance with another embodiment, a system onboard a vehicle may include a vehicle management system (VMS) and a mission management system (MMS). The VMS may include a plurality of VMS nodes for controlling operation of the vehicle and the MMS may include a plurality of MMS nodes for controlling equipment associated with a mission of the vehicle. An application may run on each VMS node and each MMS node. A data distribution service layer may be associated with each application for communications between the applications. An abstraction layer may be configured to hide reconfiguration of the data distribution service layer from the application for use of a deterministic communications protocol.

In accordance with another embodiment, a method for transmitting messages may include receiving a message and checking the received message against a current configuration of a flexible deterministic communications network. The message may also include transmitting the received message over the flexible deterministic communications network in response to the received message conforming to the current configuration and refraining from transmitting the received message over the flexible deterministic communications network in response to the received message not conforming to the current configuration.

In accordance with an embodiment and any of the previous embodiments, the flexible deterministic network may include an end system associated with each VMS node and an end system associated with each MMS node. The flexible deterministic network may also include a switch mechanism configurable for interconnecting the end systems.

In accordance with an embodiment and any of the previous embodiments, the flexible deterministic communications network may include a set of static virtual channels and a set of dynamic virtual channels. The flexible deterministic communications network may be configurable for communicating static, deterministic messages using the static virtual channels and for communicating dynamic, non-deterministic messages using the set of dynamic virtual channels.

BRIEF DESCRIPTION OF THE DRAWINGS

The following detailed description of embodiments refers to the accompanying drawings, which illustrate specific embodiments of the disclosure. Other embodiments having different structures and operations do not depart from the scope of the present disclosure.

DETAILED DESCRIPTION

Figure 1:
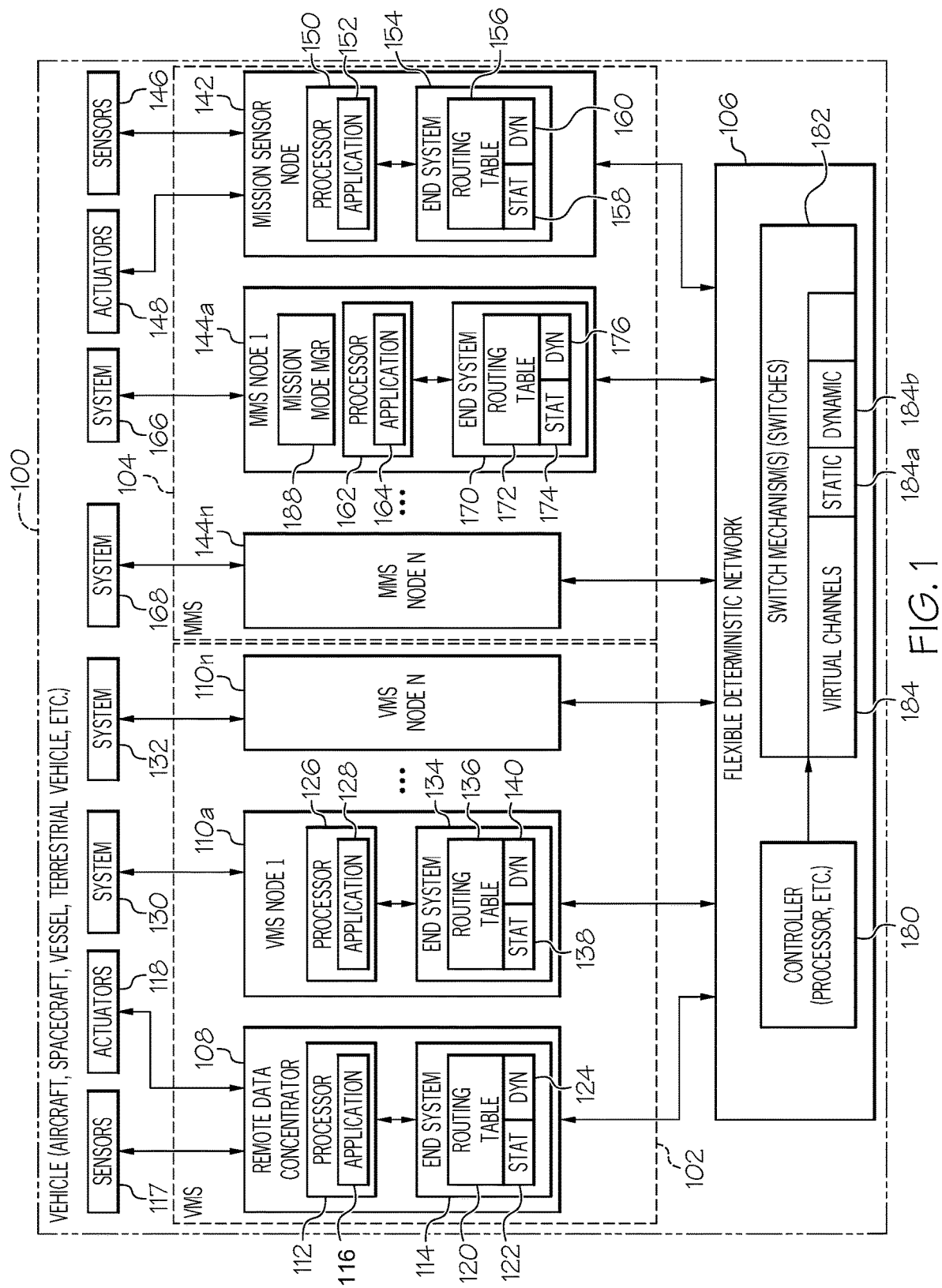
FIG. 1 is a block schematic diagram of a vehicle including an example of a VMS, MMS and flexible deterministic communications network associated with the VMS and MMS in accordance with an embodiment.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

FIG. 1 is a block schematic diagram of a vehicle 100 including an example of a vehicle management system (VMS) 102, mission management system (MMS) 104 and flexible deterministic communications network 106 associated with the VMS 102 and MMS 104 in accordance with an embodiment. The vehicle 100 may be an aircraft, spacecraft, watercraft or vessel or terrestrial vehicle. The VMS 102 may include a remote data concentrator 108 and a plurality of VMS nodes 110a-110n. The remote data concentrator 108 may include a processor 112 and an end system 114. One or more applications 116 may run on the processor 112. The one or more applications 116 may be configured for controlling operation of the remote data concentrator 108 and to receive and process signals from a plurality of sensors 117 associated with different systems, subsystems or components for operation and control of the vehicle. The one or more applications 116 may also be configured to control operation of actuators 118 or other components of the vehicle 100 to control operation and maneuvering of the vehicle 100. For example, the sensors 117 and actuators 118 may be associated with components of an aircraft that may include but is not necessarily limited to flight controls or flight control surfaces, landing gear and components thereof, environmental systems, electrical, pneumatic and hydraulic systems, communications systems and other systems or subsystems for controlling operation and maneuvering of the aircraft when airborne and on the ground.

The end system 114 may couple or connect the remote data concentrator 108 to the flexible deterministic network 106. While the end system 114 may be shown in FIG. 1 as being associated with the remote data concentrator 108, the end system 114 may actually be considered to be part of the flexible deterministic network 106 and may be reconfigured in association with the flexible deterministic network 106 as described herein. The end system 114 may include a routing table 120 for routing messages to other components or systems over the flexible deterministic network 106. The routing table 120 may include a static part 122 and a dynamic part 124. The static part 122 may be configured for routing messages to the VMS nodes 110a-110n or other components over the flexible deterministic network 106 that communicate using static, deterministic type messages. Static, deterministic messages may have a predetermined bandwidth or length. Static, deterministic messages may also be transmitted at certain times or time intervals or time slots and/or at particular frequencies or under certain conditions or states. The dynamic part 124 of the routing table 120 may be configured for routing messages to components of the MMS 104 or other components over the flexible deterministic network 106 that may communicate using dynamic, non-deterministic type messages. Dynamic, non-deterministic messages do not necessarily have a set bandwidth or length. Dynamic, non-deterministic messages may be sent at any time and may be any length based on needs of the MMS 204 and equipment or components for carrying out a mission or purpose of the vehicle 100. Whether the messages are delivered may depend on the configuration of the flexible deterministic network 106 at the time the message is being sent. As described in more detail herein, the end system 114 may be reconfigured using the routing table 120 including the static part 122 for transmitting and receiving static, deterministic type messages from the VMS nodes 110a-110n over the flexible deterministic network 106 and using the dynamic part 124 for transmitting and receiving dynamic, non-deterministic type messages from components of the MMS 104. The static part 122 of the routing table is configured before the vehicle 100 is powered on and cannot be reconfigured which is why it is referred to as the static part 122.

Each VMS node 110a-110n may include a processor 126 and one or more applications 128 running on the processor 126. Each VMS node 110a-110n may be associated with one or more systems 130-132, subsystems or components of the vehicle 100 that control operation and maneuvering of the vehicle 100. Examples of the systems 130-132, subsystems or components of the vehicle 100, if the vehicle 100 is an aircraft, may include but is not necessarily limited to flight controls, landing gear, cabin and cockpit environmental systems, electrical, pneumatic and hydraulic systems, communications systems, navigation systems and other systems or subsystems for controlling operation and maneuvering of the aircraft when airborne and on the ground. The applications 128 running on the processor 126 of each VMS node 110a-110n may be configured to control operation of one or more associated systems 130-132, subsystems or components. The processor 126 may be similar to the processor 112 of the remote data concentrator 208 or may be a unique device, such as a microprocessor or other computing device programmed to perform specific functions to control a vehicle system, subsystem or component.

Each VMS node 110a-110n may also include an end system 134 to couple or connect the VMS node 110a-110n to the flexible deterministic network 106 for transmitting and receiving messages. While the end system 134 is shown as being associated with the VMS node 110a, the end system 134 may actually be considered to be part of the flexible deterministic network 106 and may be reconfigured as part of the flexible deterministic network as described herein. The end system 134 may be similar to the end system 114 of the remote data concentrator. The end system 130 may also include a routing table 136 and the routing table may include a static part 138 and a dynamic part 140. As described in more detail below, the end system 134 may be reconfigured using the routing table 136 including the static part 138 for transmitting and receiving static, deterministic messages over the flexible deterministic network 106, and using the dynamic part 140 of the routing table 136 for transmitting and receiving dynamic, non-deterministic messages over the flexible deterministic network 106.

In an aircraft, the VMS nodes 110*a*-110*n* and remote data concentrator 108 may communicate with one another over the flexible deterministic network 106 using Aeronautical Radio, Incorporated (ARINC) 664 or A 664 message protocol which is a static, deterministic protocol.

The MMS 104 may include a mission sensor node 142 and a plurality of MMS nodes 144*a*-144*n*. The mission sensor node 142 may be coupled or connected to a plurality of sensors 146 and to a plurality of actuators 148 or other equipment. The mission sensor node 142 may control operation of the actuators 148 in response to signals from the sensors 146 and other information that the mission sensor node 142 may receive from other components. Each of the sensors 146 and actuators 148 may be associated with a system, subsystem or component for performing a mission or purpose of the vehicle 100. Examples of systems, subsystems or components for performing a mission of the vehicle 100 may include but is not necessarily limited to surveillance systems, such as integrated surveillance radar (ISR) systems, optical surveillance systems or other type surveillance systems, weapons systems, electronic countermeasures or communications jamming systems and other systems for performing a specific mission. MMS nodes 144*a*-144*n* may communicate with one another using Data Distribution Service (DDS) protocol which is a dynamic, non-deterministic protocol. Operation or performance of mission systems may not be as critical as performance of vehicle systems which may be important to prevent damage or loss of the vehicle 100. Therefore, VMS 102 communications may take precedence over MMS 104 communications with respect to configuring the flexible deterministic network 106 and end systems 114, 134, 154 and 170. While the end systems 114, 134, 154 and 170 may be shown as being associated with or part of the respective nodes 108, 110*a*-110*n*, 142 and 144*a*-144*n*, the end systems may also be considered to be part of the flexible deterministic network 106.

The mission sensor node 142 may include a processor 150. One or more applications 152 may be operating on the processor 150. The one or more applications 152 may be configured to cause the processor 150 to control operation of the mission sensor node 142 and the actuators 148 or other equipment in response to signals from the sensors 146 for performing missions by the vehicle 100.

The mission sensor node 142 may also include an end system 154. The end system 154 may couple or connect the mission sensor node 142 to the flexible deterministic network 106. While the end system 154 may be shown in FIG. 1 as being associated with the mission sensor node 142, the end system 154 may actually be considered to be part of the flexible deterministic network 106. The end system 154 may be similar to the end system 114 of the remote data concentrator 108 and end system 134 of each VMS node 110*a*-110*n*. Accordingly, the end system 154 may include a routing table 156 for routing messages to other components or systems over the flexible deterministic network 106. The routing table 156 may include a static part 158 and a dynamic part 160. The static part 158 may be configured for routing messages to the VMS nodes 110*a*-110*n* or other components over the flexible deterministic network 106 that communicate using static, deterministic type messages. The dynamic part 160 of the routing table 156 may be configured for routing messages to the MMS nodes 144*a*-144*n* or other components over the flexible deterministic network 106 that may communicate using dynamic, non-deterministic type messages. As described in more detail herein, the end system 154 may be reconfigured using the routing table 156 including the static part 158 for transmitting and receiving static, deterministic type messages from the VMS nodes 110*a*-110*n* and other components that use a similar deterministic communications protocol over the flexible deterministic network 106. The dynamic part 160 may be used for transmitting and receiving dynamic, non-deterministic type messages from MMS nodes 144*a*-144*n* and other components that user a similar non-deterministic communications protocol over the flexible deterministic network 106.

Each MMS node 144*a*-144*n* may include a processor 162 and one or more applications 164 running on the processor 126. Each MMS node 144*a*-144*n* may be associated with one or more mission oriented systems 166-168, subsystems or components for performing one or missions or purposes of the vehicle 100. As previously described, examples of the systems 166-168, subsystems or components for performing missions of the vehicle 100 may include but is not necessarily limited to surveillance systems, such as integrated surveillance radar (ISR) systems, optical surveillance systems or other type surveillance systems, weapons systems, electronic countermeasures or communications jamming systems and other systems for performing specific missions. The applications 164 running on the processor 162 of each MMS node 144*a*-144*n* may be configured to control operation of one or more associated mission oriented systems, subsystems or components. The processor 162 may be similar to the processors 112 and 126 of the remote data concentrator 108 and VMS nodes 110*a*-110*n* or may be a unique device, such as a microprocessor or other computing device programmed to perform specific functions to control a mission oriented system, subsystem or component.

Each MMS node 144*a*-144*n* may also include an end system 170 to couple or connect the MMS node 144*a*-144*n* to the flexible deterministic network 206 for transmitting and receiving messages. While the end system 170 is shown in the example of FIG. 1 as being associated with the MMS node 144*a*, the end system 170 may actually be considered to be part of the flexible deterministic network 106 and may be reconfigured therewith. The end system 170 may be similar to the end system 154 of the mission sensor node 142 and end systems 114 and 134. The end system 170 may also include a routing table 172. The routing table 172 may include a static part 174 and a dynamic part 176. As described in more detail below, the end system 170 may be reconfigured using the routing table 172 including the static part 174 for transmitting and receiving static, deterministic messages over the flexible deterministic network 106. The dynamic part 176 of the routing table 136 may be used for configuring the end system 170 for transmitting and receiving dynamic, non-deterministic messages over the flexible deterministic network 106. The flexible deterministic network 106 and end systems 114 may also be reconfigured under control of any of the applications 110, 128, 152 and 164.

The flexible deterministic network 106 may include a controller 180. The controller 180 may be a processor or other electronic device for controlling operation of the flexible deterministic network 106 and for configuring or reconfiguring at least portions of the flexible deterministic network 106 as described in more detail herein for transmitting or communicating static, deterministic messages and dynamic, non-deterministic messages. The controller 180 may be configured to perform at least some of the functions or operation similar to that described in the exemplary methods 600-800 of FIGS. 6-8. Any of the processors 112, 126, 150 and 162 on any of the nodes 108, 110a-110n, 142, 144a-144n may also perform the function or functions or the controller 180.

The flexible deterministic network 106 may also include a switch mechanism 182. The switch mechanism 182 may include a plurality of switches for routing messages between the nodes 108, 110a-110n, 142 and 144a-144n. The switching mechanism 182 may also include or may generate one or more virtual channels 184. A virtual channel 184 may be established between a particular pair of nodes 108, 110a-110n, 142, 144a-144n through the switch mechanism 182 for communication between the particular pair of nodes. The particular pair of nodes may be any combination of VMS nodes 110a-110n and MMS nodes 144a-144n, mission sensor node 142 and remote data concentrator 108. The flexible deterministic network 106 or switch mechanism 182 may include or may create a set of static virtual channels 184a and a set of dynamic virtual channels 184b. Accordingly, the flexible deterministic network 106 may be configured for communicating static, deterministic messages using the static virtual channels 184a and may be configured for communicating dynamic, non-deterministic messages using the set of dynamic virtual channels 184b. The virtual channels 184 may correspond to time slots which may be configured and/or allocated for transmission of the particular type message. The flexible deterministic network 106 may be configured for communications between a respective one of the VMS nodes 110a-110n and a respective one of the MMS nodes 144a-144n or between any combination of nodes using at least one of the set of static virtual channels 184a or the set of dynamic virtual channels 184b based on the type of message sent.

The processor 180 may detect the type of message received by the flexible deterministic network 106 and confirm that the network 106 is properly configured based on the type of message, i.e., a static, deterministic message or dynamic, non-deterministic message. The processor 180 may reconfigure the flexible deterministic network 206 for transmitting the message based on the particular type. A static virtual channel 184a may be provided or established for transmitting a static, deterministic message and a dynamic channel 184b may be provided or established for transmitting a dynamic, non-deterministic message. A static virtual channel 184a will have a predetermined bandwidth to conform to the static, deterministic message protocol. A dynamic virtual channel 184b may have a variable bandwidth that corresponds to the bandwidth of the dynamic, non-deterministic message being transmitted. A dynamic virtual channel 184b may be created or established without affecting the static virtual channel or channels.

Once a network configuration (including static and dynamic parts) is established, all messages are treated the same. There is no need to "detect" a message type. The only difference between the two message types is that one message type is fixed (always the same messages, sizes, frequencies, etc.), and the other message type uses different message sets (different messages, sizes and/or frequencies, etc.) at different times. The first message type uses the static part of the configuration, and the second message type uses the dynamic part of the configuration. The term "reconfiguration" refers to changing the dynamic portion of the configuration, and impacts the switches 182, end systems 114, 134, 154, 170 and the abstraction layers 410a-410c and 508a-508b as described with respect to FIGS. 4 and 5.

The end systems 114, 134, 154 and 170 may be reconfigured similar to that previously described using the routing tables 120, 136, 156 and 172 based on reconfiguration of the flexible deterministic network 106 for transmitting or communicating either static, deterministic message traffic or dynamic, non-deterministic message traffic. In accordance with an embodiment, the end system 114 and end systems 170 of certain MMS nodes 144a-144n and end systems 134 of certain VMS nodes 110a-110n may be selectively reconfigured for communications with one another based on a particular type, static or dynamic, message traffic and appropriate virtual channels 184, static or dynamic, may be created or established. Similarly, end system 114 of the remote data concentrator 108 and end system 154 of the mission sensor node 142 may be reconfigured base on a particular message set. Instructions may be transmitted by the processor 180 to the end systems or effected end systems 114, 134, 154 and 170 of the particular configuration or mode change for communicating either static, deterministic messages or dynamic, non-deterministic messages. In another embodiment, the flexible deterministic network 106 may be configured or reconfigured for communicating a particular message set and all end systems 114, 134, 154 and 170 may be configured or reconfigured for communicating the same message set.

Operation or performance of mission systems may not be as critical as performance of vehicle systems which may be important to prevent damage or loss of the vehicle 100. Therefore, VMS 102 communications or messages may take precedence over MMS 104 communications or messages with respect to configuring the flexible deterministic network 106 and end systems 114, 134, 154, 170. Accordingly, a dynamic, non-deterministic message may not be transmitted or the network 106 and end systems 114, 134, 154 and 170 may not be reconfigured for communicating the dynamic, non-deterministic message if there is insufficient bandwidth for the message on the network 106 because of static, deterministic message traffic. The network 106 and end systems 114, 134, 154 and 170 may be reconfigured for communicating or transmitting dynamic, non-deterministic message traffic if there is sufficient available bandwidth on the flexible deterministic network as determined by the processor 180 or one of the applications 110, 128, 152 or 164 operating on one of the nodes.

A mission mode manager 188 may detect reconfiguration ("reactive") of the flexible deterministic network 106 which may be defined as a mode change, or the mission mode manager 188 may initiate a mode change and thereby cause a reconfiguration ("proactive"). A mission mode manager 188 may reside on one or more MMS nodes 144a-144n. The mission mode manager 188 may transmit a notification to the MMS nodes 144a-144n or applications 164 and mission sensor node 142 of the mode change or reconfiguration and to switch to the new mode or configuration for transmitting either static, deterministic message traffic or dynamic, non-deterministic message traffic based on the configuration of the network 106.

In accordance with an embodiment, one of the applications 110, 128, 152 or 162 may have a need for a mode change and the application may control reconfiguration of the flexible deterministic network 106 or at least pertinent portions of the flexible deterministic network 106 for communicating the particular type messages or traffic. An example of a method of an application requesting to change communications needs or a mode change will be described in more detail with reference to FIG. 7.

Figure 2:
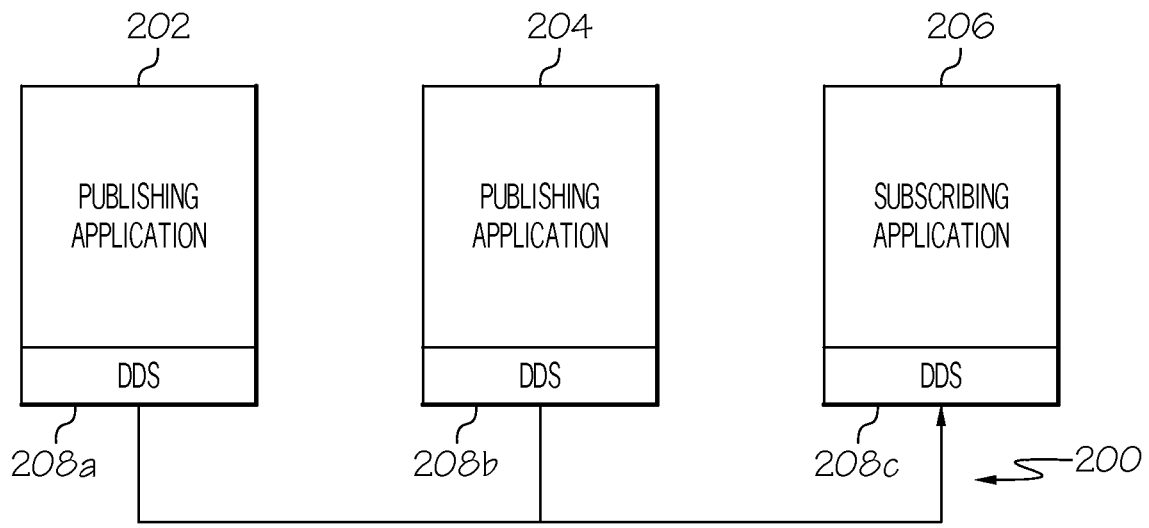
FIG. 2 is a block schematic diagram of an example of a low deterministic network including multiple publishing applications and a single subscribing application in accordance with an embodiment of the present disclosure.

FIG. 2 is a block schematic diagram of an example of a low deterministic network 200 including multiple publishing applications 202 and 204 and a single subscribing application 206 in accordance with an embodiment of the present disclosure. The low deterministic network 200 may be Ethernet or similar network. The applications 202, 204 and 206 may communicate using data distribution service (DDS) or similar low deterministic or non-deterministic protocol. Each application 202, 204 and 206 may include a DDS layer 208*a*-208*c*. The low deterministic network 200 may communicate in only one direction from the publishing applications 202 and 204 to the subscribing applications 206. The features of the low deterministic network 200 are not compatible with a high deterministic network such as that needed for communication between VMS nodes 110*a*-110*n* described with reference to FIG. 1.

Figure 3:
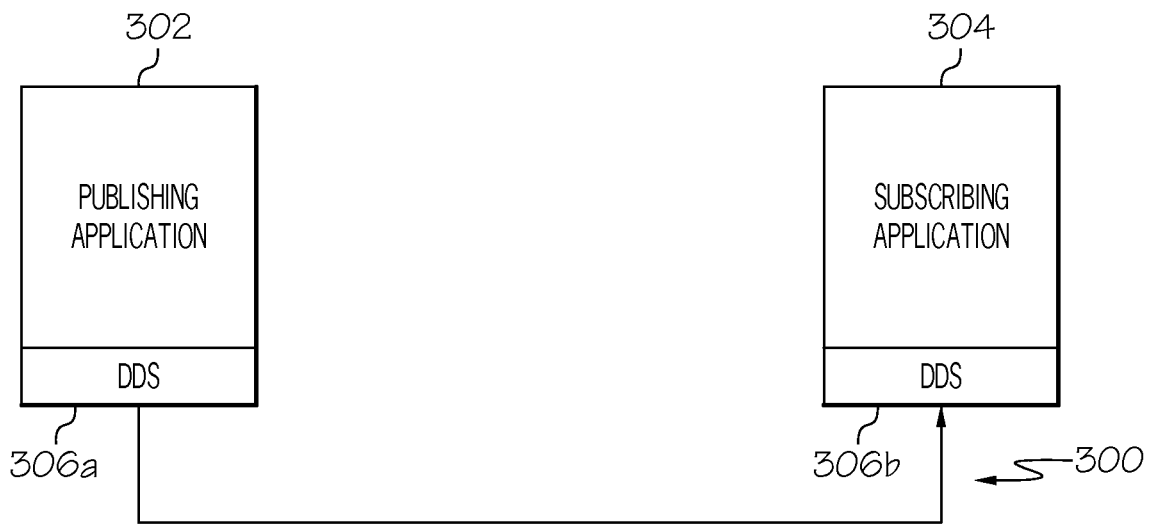
FIG. 3 is a block schematic diagram of an example of a low deterministic network including a single publishing application and a single subscribing application with two-way communications in accordance with an embodiment of the present disclosure.

FIG. 3 is a block schematic diagram of an example of a low deterministic network 300 including a single publishing application 302 and a single subscribing application 304 with two-way communication in accordance with an embodiment of the present disclosure. The two-way communication may be necessitated by features such as reliable quality of service, which requires acknowledgements for each message from subscribers. The applications 302 and 304 also communicate using DDS and may each include a DDS layer 306*a* and 306*b*. While this network may provide two-way communications, the network 300 may not be suitable for static, deterministic messages or traffic, such as communications between VMS nodes 110*a*-110*n*.

Figure 4:
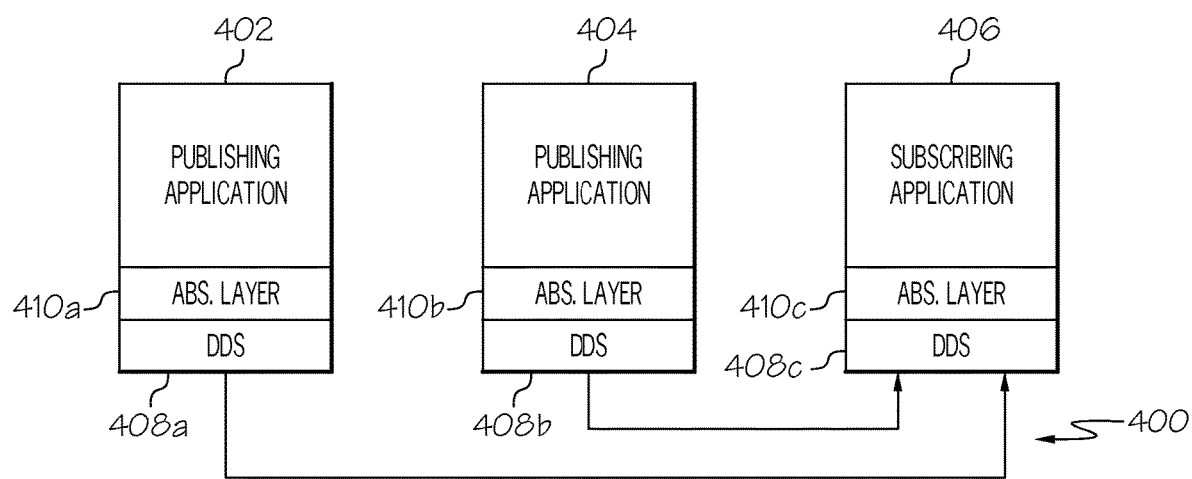
FIG. 4 is a block schematic diagram of an example of a high deterministic network including multiple publishing applications and a single subscribing application in accordance with an embodiment of the present disclosure.

FIG. 4 is a block schematic diagram of an example of a high deterministic network 400 including multiple publishing application 402 and 404 and a single subscribing application 406 in accordance with an embodiment of the present disclosure. The applications 402, 404 and 406 may also communicate using DDS and may each include a DDS layer 408*a*-408*c*. In accordance with an embodiment, an abstraction layer 410*a*-410*c* may be provided in association with each DDS layer 408*a*-408*c* to hide implementation changes to the DDS layer 408*a*-408*c* for communicating static, deterministic messages and dynamic, non-deterministic messages. The exemplary network 400 has communications in one direction from each of the publishing applications 402 and 404 to the subscribing application 406. In accordance with an embodiment, applications similar to the applications 402, 404 and 406 with a DDS layer 408*a*-408*c* and associated abstraction layer 410*a*-410*c* may be used for the applications 116, 128, 152 and 164 in FIG. 1. Applications similar to applications 402, 404 and 406 may be used with the flexible deterministic network 106 of FIG. 1 or may be used with a deterministic network, such as ARINC 664 or A664, time-triggered packets (TTP) or similar deterministic network.

Figure 5:
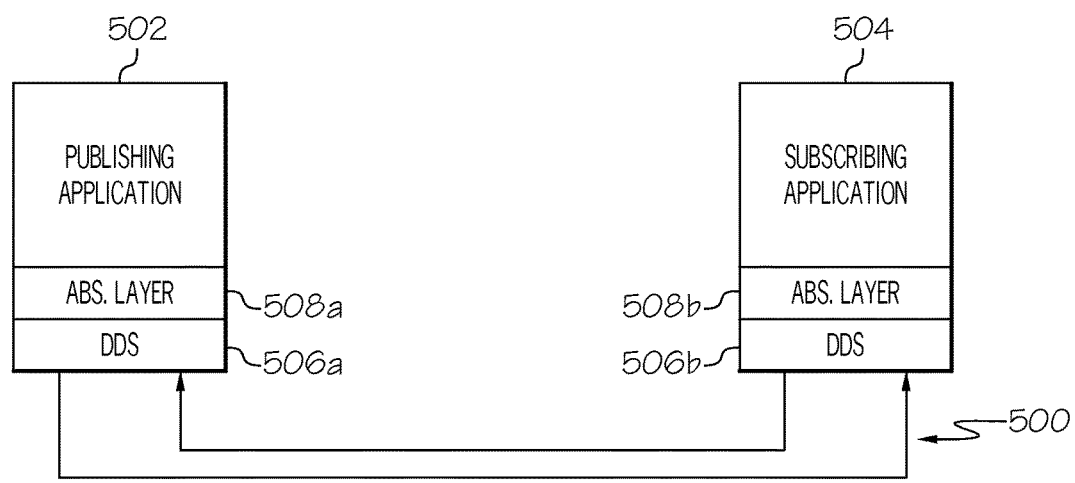
FIG. 5 is a block schematic diagram of an example of a high deterministic network including a single publishing application and a single subscribing application with two-way communications in accordance with an embodiment of the present disclosure.

FIG. 5 is a block schematic diagram of an example of a high deterministic network 500 including a single publishing application 502 and a single subscribing application 504 with two-way communications in accordance with an embodiment of the present disclosure. Each application 502 and 504 may include a DDS layer 506*a* and 506*b* and an associated abstraction layer 508*a* and 508*b*. The high deterministic network 500 implements two-way communications as two separate one-way communications, which allows for acknowledgement and may provide a more reliable quality of service compared to the network 400. Applications similar to the applications 502 and 504 with DDS layer 506*a* and 506*b* and abstraction layer 508*a* and 508*b* may also be used for the applications in FIG. 1 and may include two-way communications over a deterministic network, such as ARINC 664, TTP or similar deterministic network or the flexible deterministic network 106 as described with reference to FIG. 1.

The abstraction layer 410 and 508 hides all the implementation changes to the DDS layers 408 and 506 from the application 402-406, 502 and 504 using that protocol. The implementation changes are necessitated by the use of the deterministic communication protocol. For example, multiple publishing applications are implemented over ARINC 664 protocol using multiple virtual channels or links (one per publisher). This can be hidden from the application by the use of the abstraction layer 410 and 508. Similarly, messages requiring acknowledgements and their corresponding acknowledgements were sent on the same channel previously. Using ARINC 664, acknowledgements would be sent on separate virtual channels or links. This implementation detail can also be hidden from the applications using such messages by the abstraction layer 410 and 508.

The solution described with reference to FIGS. 4 and 5 is to map DDS topics to communication slots (such as A664 virtual links or channels or time-triggered packets in TTP), and to provide additional capabilities that automatically perform the data manipulations necessary so that applications running on top can be agnostic to the underlying communication mechanism. The new capabilities may be integrated into the DDS middleware layer, or be part of a separate layer on top of DDS, such as an abstraction layer. Topics may be treated as communication slots with single publishers and multiple subscribers. The capability is provided to read from multiple communication slots to simulate the behavior of multiple publishers. The capability is also provided to use separate communication slots to simulate bi-direction communication for features such as acknowledgements, liveness of subscribers and requesting historical data. Capabilities that are unsuitable for a deterministic environment (such as creating new topics at run time) may be disabled and standard error messages may be provided if these functions are invoked. Development tools may be provided that can process documents that contain all data communications in the system along with their quality of service characteristics, and can automatically generate the full set of communication slots for those communications. The tools may automatically determine parameters of the communication slots such as data size, periodicity, etc. The tools may optionally group communications or perform other optimizations on the generated communication slots.

Figure 6:
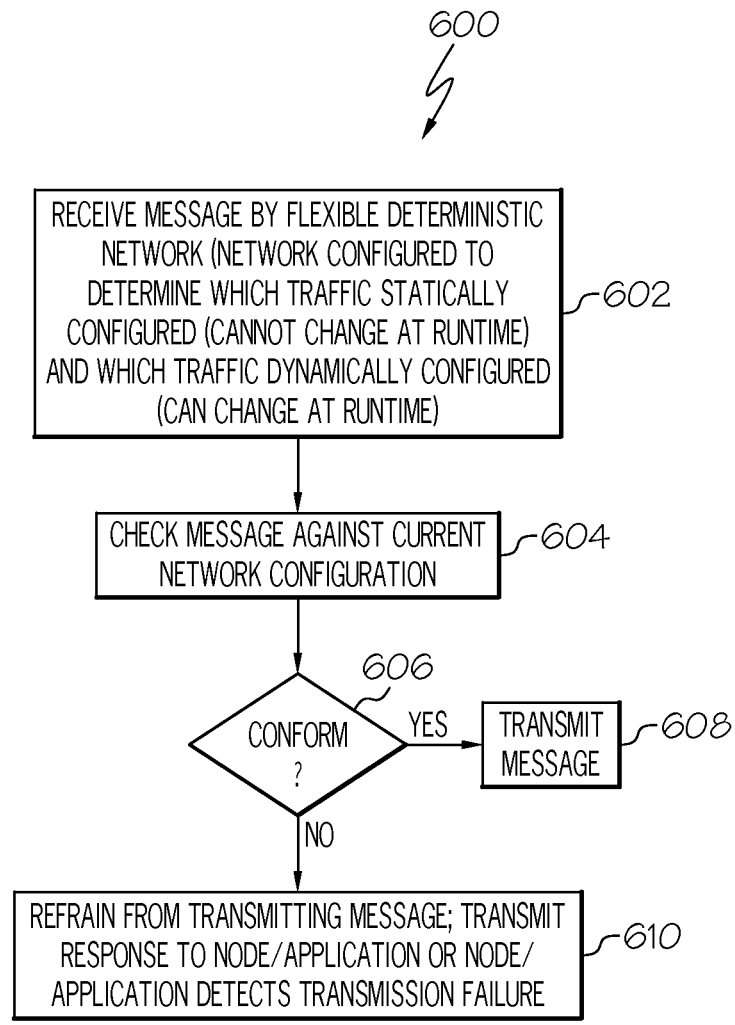
FIG. 6 is a flow chart of an example of a method for transmitting messages by a flexible deterministic communications network in accordance with an embodiment of the present disclosure.

FIG. 6 is a flow chart of an example of a method 600 for transmitting messages by a flexible deterministic communications network in accordance with an embodiment of the present disclosure. At least portions of the method 600 may be performed by the flexible deterministic network 106 and/or applications 110, 128, 152 and 164 in FIG. 1.

In block 602, a message may be received by the flexible deterministic network. The message may be a static, deterministic message or a dynamic, non-deterministic message. The flexible deterministic network may be configured to determine which message traffic may be statically configured, i.e., cannot be changed at runtime, and which message traffic may be dynamically configured, i.e., can be changed at runtime. Static, deterministic messages correspond to statically configured message traffic and dynamic, non-deterministic correspond to dynamically configured message traffic.

In block 604, the message may be checked against a current configuration of the flexible deterministic network. For example, the flexible deterministic network may be currently configured or partially configured to transmit statically configured message traffic or the network may be currently configured or partially configured to transmit dynamically configured message traffic. In block 606, if the message conforms to the current configuration of the flexible deterministic network, the method 600 may advance to block 608 and the message may be transmitted via the flexible deterministic network.

If the message does not conform to the current configuration of the flexible deterministic network in block 606, the method 600 may advance to block 610. In block 610, the network or network controller, such as controller 180 in FIG. 1, may refrain from transmitting the message. In an embodiment, a response may be transmitted by the network or network controller to a node or application that the message was not transmitted or that the network is not configured for transmitting the message. In another embodiment, the node or application running on the node may detect that the transmission of the message failed or was not sent. For example, an MMS node may transmit a dynamic, non-deterministic message for communication over the flexible deterministic network. The network or network controller may determine that the network is not configured or does not currently have sufficient bandwidth for transmitting the dynamically configured message. A response may be sent by the network or network controller to the MMS node that the network is not configured or does not have sufficient bandwidth for transmitting the message. In another embodiment, the MMS node or application may detect that the message failed or was not transmitted.

Figure 7:
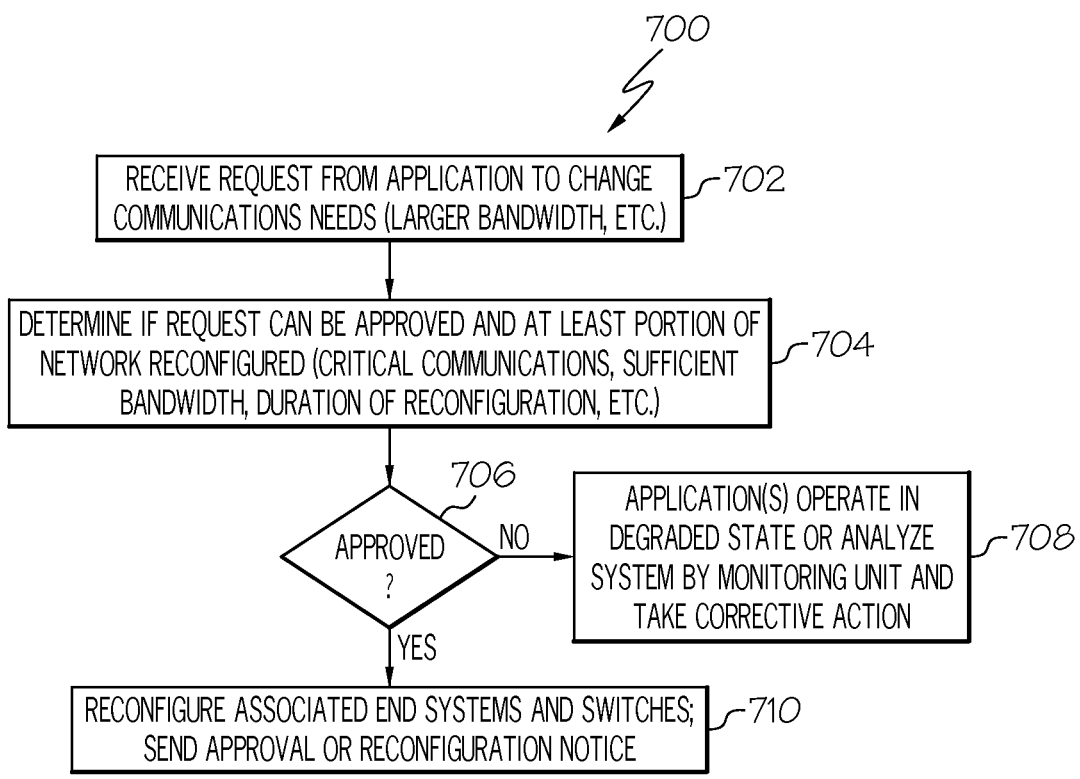
FIG. 7 is a flow chart of an example of a method for transmitting messages by a flexible deterministic communications network in accordance with another embodiment of the present disclosure.

FIG. 7 is a flow chart of an example of a method 700 for transmitting messages by a flexible deterministic communications network in accordance with another embodiment of the present disclosure. In block 702, a request may be received from a node or application running on a node to change communications needs of the flexible deterministic network. For example an MMS node or application may request to transmit a larger bandwidth message over the network. After receiving a response that the message failed or was not sent, or after detecting that transmission of the message failed, the MMS node may send a request to the network or network controller that a larger bandwidth is needed or other communication need.

In block 704, a determination may be made if the request can be approved and at least a portion of the flexible deterministic network may be reconfigured to satisfy the larger bandwidth or requested communication need. Determining if the request for a change in communications needs can be approved may include but is not necessarily limited to an available bandwidth on the flexible deterministic network based on any other communications between VMS nodes over network, an availability of bandwidth on the network corresponding to a bandwidth of the request, and a duration of the request or reconfiguration of the network or portion of the network for dynamic message traffic. As previously discussed VMS communications which may be critical to the operation of the vehicle may take priority over MMS communications.

In block 706, a determination may be made if the request for reconfiguring the flexible deterministic network was approved. If the request was not approved, the method 700 may advance to block 708. In block 708, the MMS node or application may operate in a degraded state. In another embodiment, a monitoring unit such as mission mode manager 188 in FIG. 1, may analyze the system and take corrective action.

If the request for a change in communications needs and resulting reconfiguring of the flexible deterministic network is approved in block 706, the method 700 may advance to block 710. In block 710, the flexible deterministic network may be reconfigured for transmitting the dynamically configured traffic. Any switches or switch mechanisms may be operated to accommodate the new communications needs. An approval of the request may be sent to the requesting MMS node or application. The associated end systems of the VMS nodes and MMS nodes may be reconfigured. Similar to that previously described, the end systems may be reconfigured by using the routing tables associated with each end system for transmitting the dynamically configured message traffic.

Figure 8:
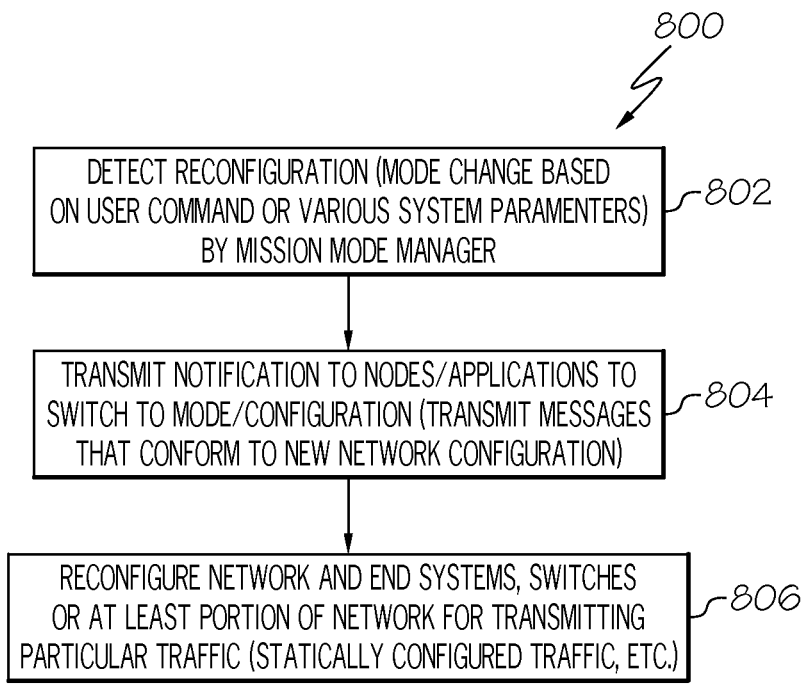
FIG. 8 is a flow chart of an example of a method for transmitting messages by a flexible deterministic communications network in accordance with a further embodiment of the present disclosure.

FIG. 8 is a flow chart of an example of a method 800 for transmitting messages by a flexible deterministic communications network in accordance with a further embodiment of the present disclosure. In block 802, reconfiguration of the network or mode change may be detected by a mission mode manager. In block 804, a notification may be transmitted to other MMS nodes or applications to switch to the new mode or configuration for transmitting dynamically configured message traffic. Messages may then be transmitted by the MMS nodes or applications and VMS nodes or applications that conform to the new network configuration.

In block 806, the flexible deterministic network and end systems may be reconfigured for transmitting statically configured message traffic in response to a predetermined action. For example, the flexible deterministic network and end systems may be reconfigured after completion of transmission of the dynamically configured traffic or after a request or predetermined action by a user to reconfigure the network for statically configured message traffic.

Figure 9:
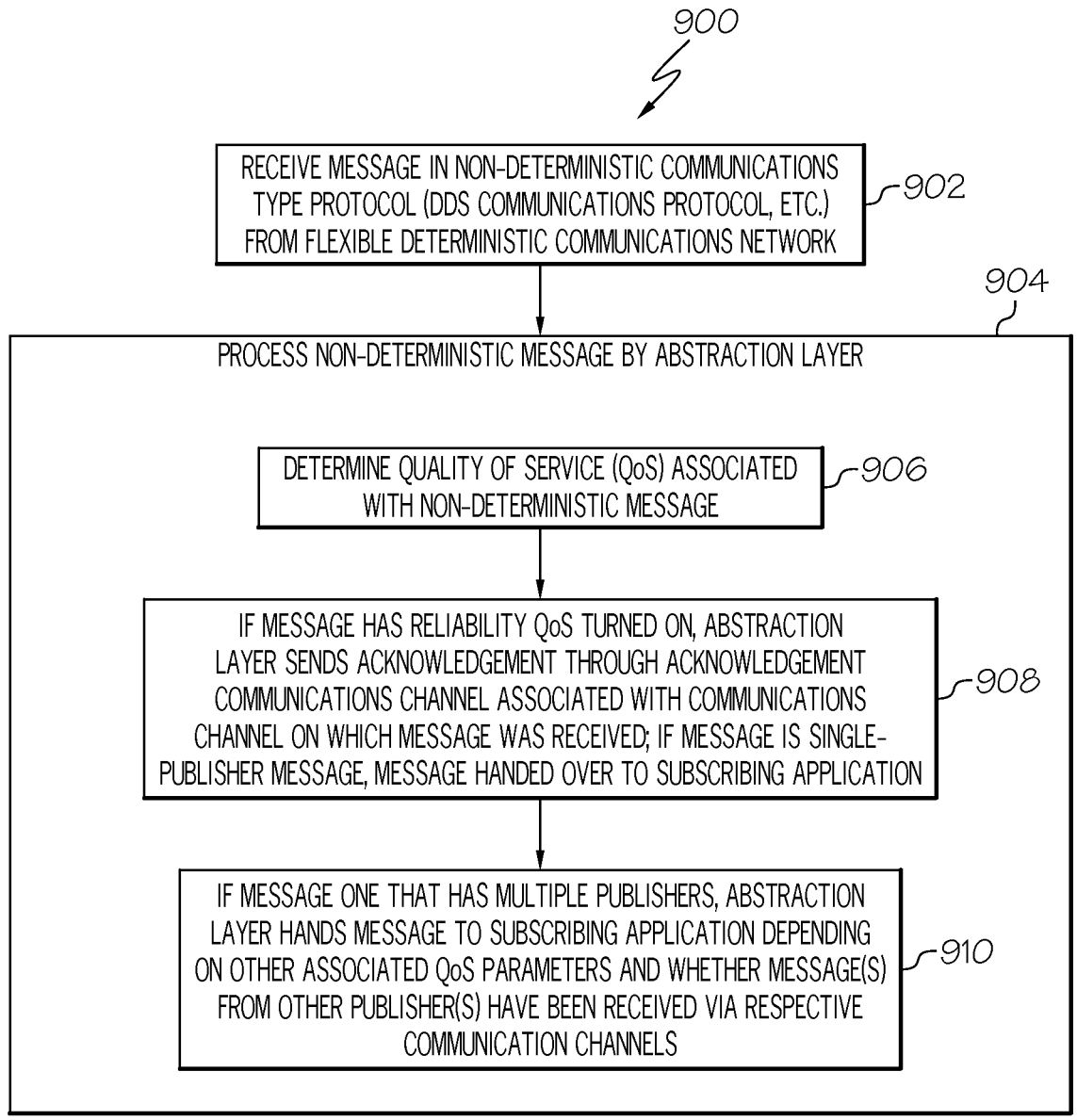
FIG. 9 is a flow chart of an example of a method for transmitting a message formatted in a non-deterministic communications type protocol over a deterministic communications network or flexible deterministic communications network in accordance with an embodiment of the present disclosure.

FIG. 9 is a flow chart of an example of a method 900 for transmitting a message formatted in a non-deterministic communications type protocol over a deterministic communications network or flexible deterministic communications network in accordance with an embodiment of the present disclosure. In block 902, a message may be received in a non-deterministic communications type protocol by a processor or a node from a flexible deterministic network. For example, the message may be a data distribution service (DDS) communications protocol message or other non-deterministic communications type message. As previously described, MMS nodes 244a-244n and mission sensor node 242 may communicate using DDS communications protocol.

In block 904, the non-deterministic message may be processed by the abstraction layer. Blocks 906-910 are exemplary functions that may be performed by an abstraction layer to process the non-deterministic message. In block 906, a quality of service (QoS) associated with the non-deterministic message may be determined by the abstraction layer.

In block 908, if the message has reliability quality of service turned on, the abstraction layer may send an acknowledgement. The acknowledgement may be send through an acknowledgement communications channel that is associated with the communications channel on which the message was received. If the message is a single-publisher message or from a single-publisher, the message may be handed over or passed to the subscribing application.

In block 910, if the message is one that has multiple publishers, the abstraction layer may hand over or pass the message to the subscribing application depending on other associated quality of service parameters and whether the message from another publisher or messages from other publishers have been received via a communication channel associated with the other publisher or via a respective communication channel associated with each of the other publishers. Whether a data value, or sample in DDS terminology, is provided to the subscriber may depend on factors or parameters related to the quality of service. Examples of the parameters or factors may include but is not necessarily limited to "OWNERSHIP", "OWNERSHIP_STRENGTH", "TIME_BASED_FILTER", "LIFESPAN", "HISTORY", and "RESOURCE_LIMITS". OWNERSHIP may be exclusive or shared. OWNERSHIP_STRENGTH is used to determine which publisher's data is retained when EXCLUSIVE is selected. TIME_BASE_FILTER means only one value each "minimum_separation" period is presented to the subscriber. LIFESPAN means that data that is older than this value is dropped. HISTORY determines what happens if newer values are received prior to this being read by the subscriber. RESOURCE_LIMITS provides that if "max_samples" is exceeded, data values are dropped to stay within limits.

The flowchart and block diagrams in the Figures illustrate the architecture, functionality, and operation of possible implementations of systems and methods according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for transmitting messages, comprising:
receiving a message;
checking the received message against a current configuration of a flexible deterministic communications network;
transmitting the received message over the flexible deterministic communications network in response to the received message conforming to the current configuration;
refraining from transmitting the received message over the flexible deterministic communications network in response to the received message not conforming to the current configuration; and
reconfiguring the flexible deterministic communications network between communicating static, deterministic messages and dynamic, non-deterministic messages based on which one of the static, deterministic messages or the dynamic, non-deterministic messages is received by the flexible deterministic communications network and the flexible deterministic communications network being currently configured for communicating another one of the static, deterministic messages or the dynamic, non-deterministic messages, wherein reconfiguring the flexible deterministic network comprises:
reconfiguring a switching mechanism, the switching mechanism comprising a plurality of switches for routing messages between nodes, the switching mechanism being configured to establish a static virtual channel or a dynamic virtual channel between a particular pair of nodes in response to a type of message being transmitted between the particular pair of nodes, the static virtual channel comprising a fixed size bandwidth allocated for communicating the static, deterministic messages and the dynamic virtual channel comprising a variable sized bandwidth allocated for communicating the dynamic, non-deterministic messages, wherein the message is received by a processor in the flexible deterministic network and connected to the switching mechanism, the processor being configured to determine if the received message conforms to the current configuration of the flexible deterministic communications network, transmit the received message over the flexible deterministic network in response to the received message conforming to the current configuration of the flexible deterministic network, and reconfigure the flexible deterministic network by controlling the switching mechanism in response to the received message not conforming to the current configuration of the flexible deterministic network; and
only interconnecting nodes onboard a vehicle by the flexible deterministic communications network.

2. The method of claim 1, further comprising:
receiving a request from an application to reconfigure the flexible deterministic communications network based on communications needs of the application;
determining an approval of the request; and reconfiguring at least a portion of the flexible deterministic network to accommodate the communications needs of the application in response to approval of the request.

3. The method of claim 2, wherein determining if the request can be approved comprises determining an available bandwidth on the flexible communications network based on current communications between a plurality of nodes over the flexible deterministic network and the available bandwidth corresponding to a bandwidth of the request.

4. The method of claim 3, further comprising:
reconfiguring an end system of at least each of the nodes communicating with one another, each node comprising a routing table, the routing table being used to reconfigure the end system between transmitting or communicating static, deterministic messages and dynamic, non-deterministic messages; and
reconfiguring the switch mechanism for interconnecting the end systems.

5. A system onboard a vehicle, comprising:
a vehicle management system (VMS), the VMS comprising a plurality of VMS nodes for controlling operation of the vehicle;
a mission management system (MMS), the MMS comprising a plurality of MMS nodes for controlling equipment associated with a mission of the vehicle; and
a flexible deterministic communications network configurable for communications between each of the VMS nodes, between each of the MMS nodes and between the VMS nodes and the MMS nodes, wherein the VMS nodes communicate using static, deterministic messages and the MMS nodes communicate using dynamic, non-deterministic messages, wherein the flexible deterministic communications network is reconfigured between communicating the static, deterministic messages and the dynamic, non-deterministic messages based on which one of the static, deterministic messages or the dynamic, non-deterministic messages is received by the flexible deterministic communications network and the flexible deterministic communications network being currently configured for communicating another one of the static, deterministic messages or the dynamic, non-deterministic messages, wherein the flexible deterministic communications network only interconnects nodes onboard the vehicle and wherein the flexible deterministic network comprises:
a switching mechanism for reconfiguring the flexible deterministic network, the switching mechanism comprising a plurality of switches for routing messages between the VMS nodes and the MMS nodes, the switching mechanism being configured to establish a static virtual channel or a dynamic virtual channel between a particular pair of nodes in response to a type of message being transmitted between the particular pair of nodes, the static virtual channel comprising a fixed size bandwidth allocated for communicating the static, deterministic messages and the dynamic virtual channel comprising a variable sized bandwidth allocated for communicating the dynamic, non-deterministic messages; and
a processor connected to the switching mechanism, the processor being configured to perform a set of functions comprising:

receiving a message;
determining if the received message conforms to a current configuration of the flexible deterministic communication network;
transmitting the received message over the flexible deterministic communications network in response to the received message conforming to the current configuration of the flexible deterministic network; and
reconfiguring the flexible deterministic communications network by controlling the switching mechanism in response to the received message not conforming to the current configuration of the flexible deterministic network.

6. The system of claim 1, wherein the flexible deterministic network comprises:
an end system associated with each VMS node, each VMS node end system comprising a routing table, the routing table being used to reconfigure the VMS end system for transmitting or communicating either the static, deterministic messages or the dynamic, non-deterministic messages;
an end system associated with each MMS node, each MMS node end system comprising a routing table, the routing table being used to reconfigure the MMS end system for transmitting or communicating either the static, deterministic messages or the dynamic, non-deterministic messages; and
wherein the switch mechanism is configurable for interconnecting the end systems.

7. The system of claim 6, wherein the particular pair of nodes comprise any combination of VMS nodes and MMS nodes.

8. The system of claim 1, wherein the flexible deterministic communications network comprises:
a set of static virtual channels; and
a set of dynamic virtual channels, the flexible deterministic communications network being configurable for communicating the static, deterministic messages using the static virtual channels and the flexible deterministic communications network being configurable for communicating the dynamic, non-deterministic messages using the set of dynamic virtual channels.

9. The system of claim 8, wherein the flexible deterministic network is configurable for communications between a respective one or more of the VMS nodes and a respective one or more of the MMS nodes using at least one of the set of static virtual channels and the set of dynamic virtual channels.

10. The system of claim 1, wherein the processor is configured to perform a set of functions further comprising:
refraining from transmitting the received message over the flexible deterministic communications network in response to the received message not conforming to the current configuration.

11. The system of claim 10, wherein the set of functions further comprises:
receiving a request, by the processor associated with the flexible deterministic network, from an application operating on one of the MMS nodes or VMS nodes to reconfigure the flexible deterministic communications network based on communications needs of the application;
determining, by the processor associated with the flexible deterministic network, an approval of the request; and
reconfiguring at least a portion of the flexible deterministic network by the switching mechanism of the flexible deterministic network to accommodate the communications needs of the application in response to approval of the request.

12. The system of claim 11, wherein reconfiguring at least a portion of the flexible deterministic network comprises:
reconfiguring an end system associated with each of the MMS nodes or VMS nodes communicating with one another; and
reconfiguring the switch mechanism for interconnecting the end systems.

13. The system of claim 12, wherein the requesting application coordinates reconfiguration of the end systems and the switch mechanism.

14. The system of claim 11, wherein determining if the request can be approved comprises determining an available bandwidth on the flexible deterministic communications network based on existing communications between the nodes over the flexible deterministic network and at least the available bandwidth corresponding to a bandwidth of the request.

15. The system of claim 11, wherein at least the requesting application operates in a degraded state in response to the request to reconfigure the flexible deterministic communications network not being approved.

16. The system of claim 1, wherein the system is deployed on an aircraft.

17. The system of claim 1, further comprising a mission mode manager that detects reconfiguration of the flexible deterministic network, wherein the mission mode manager transmits a notification to each of the MMS nodes that the flexible deterministic network has been reconfigured and to switch to a new configuration for communicating over the reconfigured flexible deterministic network.

18. A system onboard a vehicle, comprising:
a vehicle management system (VMS), the VMS comprising a plurality of VMS nodes for controlling operation of the vehicle;
a mission management system (MMS), the MMS comprising a plurality of MMS nodes for controlling equipment associated with a mission of the vehicle;
an application running on each VMS node and each MMS node;
a data distribution service layer associated with each application for communications between the applications;
an abstraction layer associated with each application, the abstraction layer being configured to hide reconfiguration of the data distribution service layer from the application for use of a deterministic communications protocol; and
a flexible deterministic communications network configurable for communications between each of the VMS nodes, between each of the MMS nodes and between the VMS nodes and the MMS nodes, wherein the VMS nodes communicate using static, deterministic messages and the MMS nodes communicate using dynamic, non-deterministic messages, wherein the flexible deterministic communications network is reconfigured between communicating the static, deterministic messages and the dynamic, non-deterministic messages based on which one of the static, deterministic messages or the dynamic, non-deterministic messages is received by the flexible deterministic communications network and the flexible deterministic communications network being currently configured for communicating another one of the static, deterministic messages or the dynamic, non-deterministic messages, wherein the flexible deterministic communications network only interconnects nodes onboard the vehicle and wherein the flexible deterministic network comprises:
a switching mechanism for reconfiguring the flexible deterministic network, the switching mechanism comprising a plurality of switches for routing messages between the VMS nodes and the MMS nodes, the switching mechanism being configured to establish a static virtual channel or a dynamic virtual channel between a particular pair of nodes in response to a type of message being transmitted between the particular pair of nodes, the static virtual channel comprising a fixed size bandwidth allocated for communicating the static, deterministic messages and the dynamic virtual channel comprising a variable sized bandwidth allocated for communicating the dynamic, non-deterministic messages; and
a processor connected to the switching mechanism, the processor being configured to perform a set of functions comprising:
receiving a message;
determining if the received message conforms to a current configuration of the flexible deterministic communication network;
transmitting the received message over the flexible deterministic communications network in response to the received message conforming to the current configuration of the flexible deterministic network; and
reconfiguring the flexible deterministic communications network by controlling the switching mechanism in response to the received message not conforming to the current configuration of the flexible deterministic network.

19. The system of claim 18, wherein the abstraction layer is configured to perform at least one of a set of functions comprising:
determining a quality of service associated with a message formatted in a non-deterministic communications protocol;
sending an acknowledgement to a publisher of the message formatted in the non-deterministic communications protocol in response to the message having a reliability quality of service turned on and the message being from a single publisher and the message is handed over to a subscribing application; and
passing the message in the non-deterministic communications protocol to a subscribing application in response to the message being a message that has multiple publishers and depending on one or more quality of service parameters associated with the message, the one or more quality of service parameters comprising ownership, an ownership strength, a time based filter, a lifespan, history and resource limits.

* * * * *